(12) United States Patent
Khalighi

(10) Patent No.: US 7,874,610 B2
(45) Date of Patent: Jan. 25, 2011

(54) DRAG REDUCTION DEVICE FOR A MOTOR VEHICLE

(75) Inventor: Bahram Khalighi, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 422 days.

(21) Appl. No.: 11/766,809

(22) Filed: Jun. 22, 2007

(65) Prior Publication Data

US 2008/0315623 A1 Dec. 25, 2008

(51) Int. Cl.
*B62D 35/00* (2006.01)
(52) U.S. Cl. ............... 296/180.1; 296/180.5; 296/57.1; 296/50
(58) Field of Classification Search .............. 296/180.1, 296/180.3, 180.2, 180.5, 50, 57.1
See application file for complete search history.

(56) References Cited

U.S. PATENT DOCUMENTS

| | | | | |
|---|---|---|---|---|
| 4,372,601 A * | 2/1983 | Smith | ......................... | 296/50 |
| 4,475,759 A * | 10/1984 | Wine | ....................... | 296/180.5 |
| 4,585,265 A * | 4/1986 | Mader | ........................ | 296/56 |
| 4,682,808 A | 7/1987 | Bilanin | | |
| 5,069,498 A * | 12/1991 | Benchoff | .................. | 296/180.1 |
| 5,232,260 A * | 8/1993 | Lippard | ........................ | 296/51 |
| 5,236,242 A | 8/1993 | Seeman | | |
| 5,324,092 A * | 6/1994 | Burg | ........................ | 296/180.1 |
| 5,352,008 A | 10/1994 | Denvir | | |
| 5,468,037 A * | 11/1995 | Peterson et al. | ............ | 296/57.1 |
| 5,486,032 A * | 1/1996 | Reed et al. | ..................... | 296/50 |
| 5,727,838 A * | 3/1998 | Vallerand | .................. | 296/180.1 |
| 6,742,822 B2 | 6/2004 | Vejnar | | |
| 6,827,386 B2 * | 12/2004 | Stevenson | ..................... | 296/51 |
| 6,932,404 B2 | 8/2005 | Vejnar | | |
| 6,932,420 B1 * | 8/2005 | Donahue | .................. | 296/180.5 |
| 6,991,277 B1 * | 1/2006 | Esler | ........................... | 296/50 |

\* cited by examiner

*Primary Examiner*—Glenn Dayoan
*Assistant Examiner*—Pinel E Romain
(74) *Attorney, Agent, or Firm*—Quinn Law Group, PLLC

(57) ABSTRACT

A drag reduction device for a motor vehicle is provided that includes a substantially flat plate member preferably rotatably connected to a tailgate assembly. The tailgate assembly has at least one, but preferably two panels defining a cavity. The plate member can be selectively positioned at a first position and a second, third, or fourth position. When in the first position, the plate member is inside the cavity. In the second position, the plate member is substantially vertical, and partially extending outside the cavity. In the third position, the plate member is extending forward, preferably in a horizontal orientation outside the cavity. When in the fourth position, the plate member is extending rearward, preferably in a horizontal orientation outside the cavity. The plate member is of sufficient length when in the second, third, and fourth positions to thereby reduce the coefficient of drag and lift on the vehicle.

12 Claims, 4 Drawing Sheets

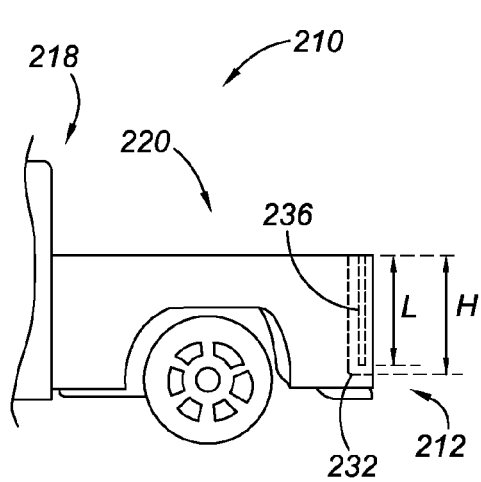
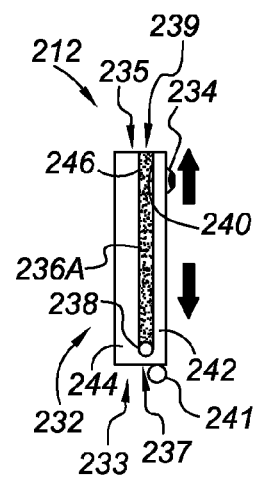
FIG. 5  FIG. 5a
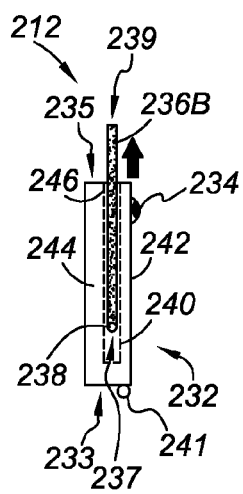
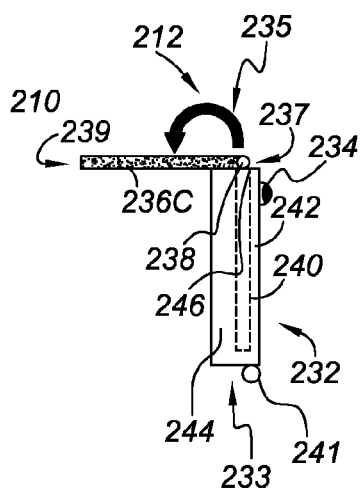
FIG. 5b  FIG. 5c
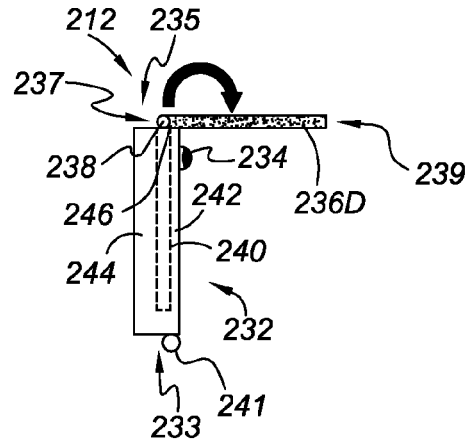
FIG. 5d

DRAG REDUCTION DEVICE FOR A MOTOR VEHICLE

TECHNICAL FIELD

This invention relates to aerodynamic drag reduction devices and aerodynamic lift reduction devices for motor vehicles.

BACKGROUND OF THE INVENTION

The aerodynamic inefficiencies associated with the traditional configuration of a pickup truck are well known. These inefficiencies are due, in large part, to the bluff-body passenger cab and the open bed of the truck closed off by a tailgate. Ambient airstreams flow relatively smoothly over the truck cab. However, when the airstream flows down into the rear bed portion of the truck, three phenomena develop during this transition which affect the base drag and aerodynamic lift forces: flow separation (also known as "eddy shedding"), turbulent airflow, and aerodynamically unfavorable pressure gradients. These phenomena can lead to, among other things, reduced fuel efficiency and vehicle instability. Notably, at typical highway cruising speeds, the majority of fuel consumed by an automobile is spent in overcoming aerodynamic drag-aerodynamic drag increasing with the square of speed.

Efforts have been made to remedy or at least alleviate the aerodynamic inefficiencies associated with the standard configuration of a pickup truck. It is well known in the prior art to attach a wing or spoiler, similar in geometry to an airfoil, to the vehicle in order to modify airflow around the vehicle in order to provide certain predetermined aerodynamic responses during vehicle operation. Another proposed remedy is to reconfigure the truck bed by including a camper shell or a bed cover, also known as a tonneau cover. The covers can be hard or soft, elevated or flush-fit.

Although these approaches do help to reduce aerodynamic drag, the benefits provided are minimal. Additionally, bed covers and camper shells provide little or no reduction in aerodynamic lift forces. Finally, permanently mounting a spoiler, camper shell, or bed cover to the pickup truck may reduce the functionality and convenience provided by the pickup bed and tailgate, intended for use in heavy loading and unloading.

As federal standards for fuel economy become more stringent and fuel costs increase, improved aerodynamic drag on pickup trucks may be required. Accordingly, it is desirable to provide a device that is capable of significantly reducing the aerodynamic drag on standard pickup trucks without reducing the normal functionality of the tailgate. Finally, the device should limit the amount of lift force and yawing moment inflicted upon the bed portion of the pickup truck.

SUMMARY OF THE INVENTION

A drag reduction device for a motor vehicle is provided that is compact, lightweight, easy to integrate into any vehicle structure, and is configured to significantly reduce the amount of aerodynamic drag on the vehicle without inefficiently adding to gross vehicle weight ("GVW"), increasing the coefficient of lift, or limiting the general functionality of a pickup truck tailgate.

In a first embodiment of the present invention, the drag reduction device includes a substantially flat plate member secured to the rear structure of the motor vehicle. The drag reduction device is configured to be selectively positioned at a first position and one or more of a second, a third, and a forth position. Ideally, the plate member can be positioned at all four positions in a single application.

When the plate member is in the first position, it is parallel to and substantially flush against the rear vehicle structure. When in the second position, the plate member is substantially vertical and preferably adjacent at only one end to the rear vehicle structure. When in the third position, the plate member extends forward of the rear vehicle structure. Finally, when in the fourth position, the plate member extends rearward of the rear vehicle structure. It is desirable that the plate member be in a substantially horizontal orientation when in the third and fourth positions.

The plate member is of a length sufficient to alter the airstream wake flow structure around and behind the motor vehicle when in motion to thereby provide a reduction in base drag and aerodynamic lift forces. The length of the plate may be selectively varied to achieve various drag and lift reductions (more tractions). Preferably, the plate member is of sufficient length to provide both a 3.6-8.9% reduction in horizontal drag coefficient and a 2.9-31.1% reduction in lift coefficient. By way of example, the length of the plate member can be ¼, ⅓, ½ or equal to the height of the rear vehicle structure (i.e., liftgate.)

In a first preferred variation of the first embodiment, the rear vehicle structure includes at least one wall that forms a cavity having an opening. In this instance, the plate member sits substantially inside the cavity when in the first position for stowage purposes.

In a second preferred variation of the first embodiment, the rear vehicle structure includes first and second panels which form a cavity therebetween. In this instance, the plate member is positioned inside the cavity when in the first position for stowage purposes.

In a second embodiment of the present invention, the drag reduction device includes a plate member and a tailgate assembly. The tailgate assembly is secured, preferably to selectively rotate at one end, to the rear structure of the motor vehicle. The tailgate assembly has a first panel that forms a recess portion. The plate member is secured, fixed, or attached at a first end to the tailgate assembly, preferably at a top end, to be selectively positioned at a first position and at least one of a second, a third, and a fourth position. Optimally, the plate member can be positioned at all four positions.

When in the first position, the plate member is located predominantly within the recess portion for stowage purposes. When the plate member is in the second position, it is in a substantially vertical orientation and extended at least partially outside the recess portion. When in the third position, the plate member extends forward of the tailgate assembly, preferably in a substantially horizontal orientation, outside the recess portion. Finally, when in the fourth position, the plate member extends rearward of the tailgate assembly, preferably in a substantially horizontal orientation, outside the recess portion. Ideally, the tailgate assembly provides a rounded first end at the leading edge of the plate member when in the third and fourth positions.

Synonymous to the first embodiment, the plate member is of a length sufficient to alter the air flow structure around and behind the motor vehicle when the vehicle is in motion. Preferably, the plate member is of sufficient length to provide a 3.6-8.9% reduction in horizontal drag coefficient and a 2.9-31.1% reduction in lift coefficient. By way of example, the length of the plate member can be ¼, ⅓, ½ or equal to the height of the tailgate assembly.

In a preferred variation of the second embodiment, the tailgate assembly includes both a first and a second panel which form the recess portion. In this instance, the plate member is positioned inside the recess portion between the first and second panels when in the first position.

In a third embodiment of the present invention, a motorized vehicle is provided. The vehicle includes a cab portion, a bed portion, a tailgate assembly, and a substantially flat plate member. The cab portion is mounted to the body of the vehicle in any manner commonly employed, and the bed portion is similarly mounted adjacent to, and preferably rearward of the cab portion. The tailgate assembly is secured, preferably to selectively rotate at one end, to the bed portion. The tailgate assembly has a first panel that forms a cavity having an opening.

Synonymous with the other embodiments of the present invention, the plate member is secured, fixed, or attached to the tailgate assembly, preferably at a first end, to be selectively positioned at a first position and at least one of a second, a third, and a forth position, the first, second, third and fourth positions oriented as described above to alter the airflow wake structure around the vehicle when moving. Ideally, the plate member can be positioned at all four positions.

In a preferred variation of the third embodiment, the tailgate assembly also includes a second panel, the first and second panels of the tailgate assembly forming the cavity. In this instance, the plate member is positioned inside the cavity between the first and second plates when in the first position.

It is also preferred that the tailgate assembly provides a rounded top end proximate to the first end of the plate member when in the third and fourth positions. In this instance, the plate member is oriented so as to not be coplanar with the top of the bed portion when in the third and fourth positions The above features and advantages, and other features and advantages of the present invention, will be readily apparent from the following detailed description of the preferred embodiments and best modes for carrying out the present invention when taken in connection with the accompanying drawings.

BRIEF DESCRIPTION OF THE DRAWINGS

FIG. 2b is a schematic side illustration of an alternate variation of the drag reduction device of FIG. 2a;

FIG. 5 is a side schematic illustration in an exploded view of a drag reduction in accordance with a third embodiment of the present invention;

FIG. 5a is a side schematic illustration in an exploded view of the drag reduction device of FIG. 5, illustrating the plate member in a first position;

FIG. 5b is a side schematic illustration in an exploded view of the drag reduction device of FIG. 5, illustrating the plate member in a second position;

FIG. 5c is a side schematic illustration in an exploded view of the drag reduction device of FIG. 5, illustrating the plate member in a third position; and FIG. 5d is a side schematic illustration in an exploded view of the drag reduction device of FIG. 5, illustrating the plate member in a fourth position.

DESCRIPTION OF THE PREFERRED EMBODIMENTS

Figure 1:
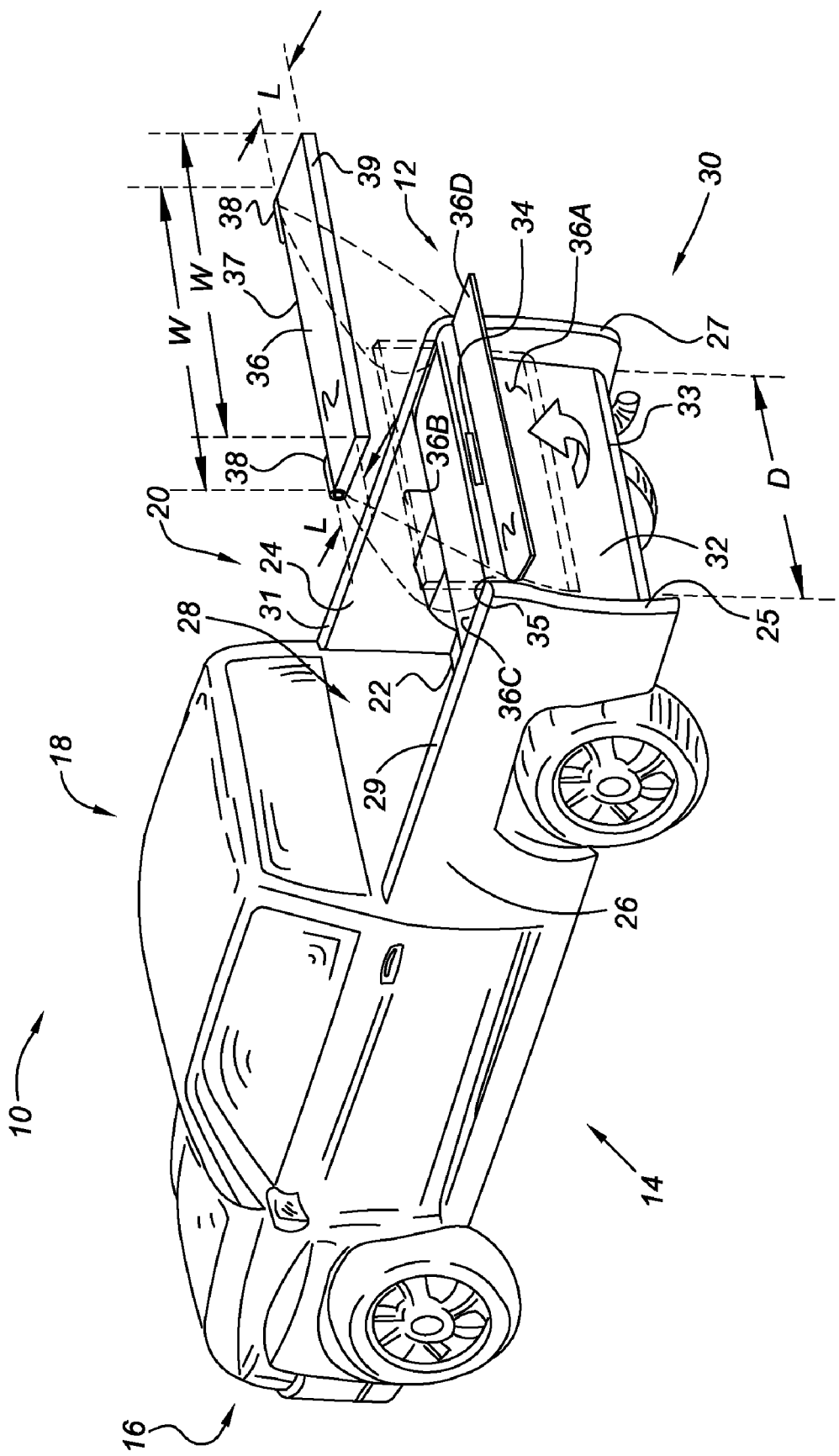
FIG. 1 is an isometric or perspective rear schematic illustration in an exploded view of a drag reduction device on a motor vehicle in accordance with a first embodiment of the present invention.

Referring now to the figures, wherein like reference numbers refer to like components throughout the several views, FIG. 1 depicts a drag reduction device, identified generally as 12, in accordance with a first embodiment of the present invention. The drag reduction device 12, and the various other embodiments depicted throughout FIGS. 1-5d are described herein for reducing the base drag and aerodynamic lift behind bluntly ended vehicles. The vehicle could be any vehicle having a relatively blunt back end, including pickup trucks (as illustrated throughout the several views), trailer and semi-trailer vans, buses, minivans, minibuses, recreational vehicles, sport utility vehicles (SUVs), etc. However, the drag reduction devices described hereinafter may be applied to additional motorized vehicle platform requiring improved aerodynamic performance, such as, but not limited to, coupes, sedans, and the like,.

Turning back to FIG. 1, a pickup truck of conventional construction is illustrated and identified generally as 10. The pickup truck 10 has a truck body 14 having a front end 16 forward of a cab portion 18, and a bed portion 20 (also referred to in the art as a cargo bed or payload area) fixed, secured, or mounted adjacent to the cab portion 18. The bed portion 20 has a bed floor 22, a forward end 28 opposing a rearward end 30, and first and second sidewalls 24, 26, respectively, that are substantially perpendicular to the bed floor 22 and have first and second vertical panels 25, 27, respectively, extending to first and second horizontal panels 29, 31, respectively.

Figure 2A:
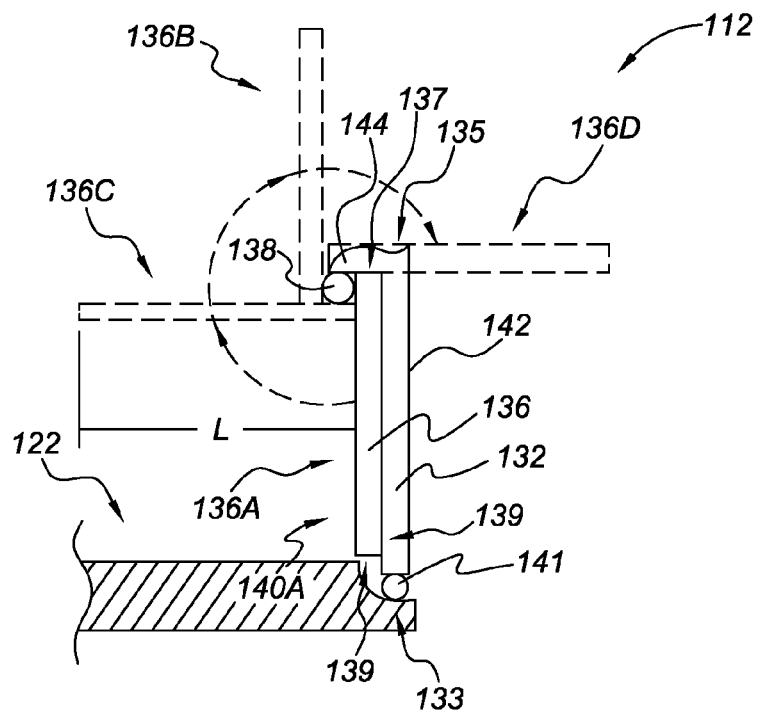
FIG. 2a is a schematic side illustration of a drag reduction device having a tailgate assembly and plate member in accordance with a second embodiment of the present invention.
Figure 2B:
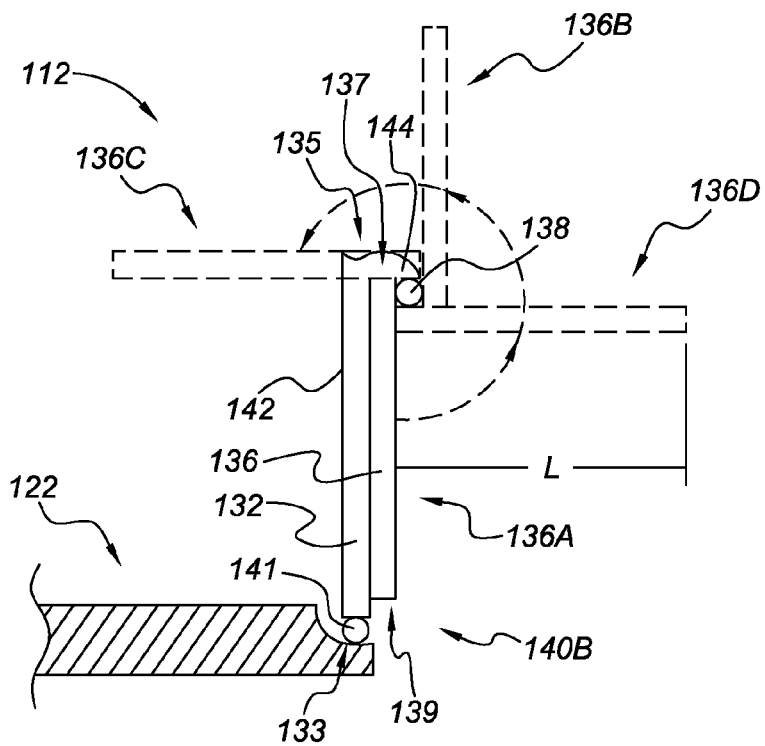

The bed portion 20 also includes a tailgate assembly 32 (also referred to herein as a liftgate, tailgate door, or rear vehicle structure) which is preferably rotatably secured, e.g., via horizontal hinge pins (as best seen in FIGS. 2a and 2b as 141) at a bottom end 33 to the bed floor 22 at the rearward end 30, as shown in FIG. 1. A latch mechanism 34, which may incorporate a locking mechanism (not shown), is employed to selectively secure the tailgate assembly 32 in a substantially vertical closed position (shown in FIG. 1), thereby forming an enclosure between the tailgate assembly 32, first and second sidewalls 24, 26, and the cab portion 18. An opening (not shown) is created between the first and second vertical panels 25, 27 when the tailgate assembly 32 is displaced from its closed position (shown in FIG. 1) to an open position (not shown), as would be readily understood by those in the art, to allow for heavy use in loading and unloading cargo (also not shown.)

In the first embodiment of the present invention, illustrated in FIG. 1, the drag reduction device 12 consists essentially of a single plate member 36. Ideally, the plate member 36 is a unitary, preformed, substantially-flat rectangular plate. It is further preferred that the plate member 36 is fabricated from a material known to have a suitable strength for the intended use of the drag reduction device 12, i.e., brushed steel or aluminum, high strength plastics, and the like, and finished with an anti-corrosive, aesthetically appealing coating (i.e., dichromate paint, zinc plating, etc., not shown.) It is also considered to be within the scope of the present invention that the plate member 36 take on additional shapes (e.g., a polygon, hexagon, etc.), include rounded edges or corners, and have varying cross sections (e.g., stepped, crescent, semi-elliptical, etc.). Preferably, the width W of the plate member 36 is substantially the same as the distance D between the first and second vertical panels 25, 27.

The plate member 36 is employed to alter the wake flow structure around and behind the bed portion 20 by selectively modifying the geometric profile of the pickup truck 10, permitting trapped or captured eddy currents to be stabilized and providing pressure recovery between the cab portion 18 and rearward end 30 of the bed portion 20. The length L of the plate member 36 can be selectively varied to provide innumerable variations in the reduction of base drag and aerodynamic lift on the pickup truck 10, depending upon the intended application of the drag reduction device 12. This will be discussed in more detail below.

The plate member 36 is secured, attached, or mounted at a first end 37, preferably in a semi-permanent manner, at or near the top end 35 of the tailgate assembly 32, via any means recognized in the art for safely and securely attaching similar components, e.g., horizontal hinge pins 38. Alternatively, the plate member 36 may be similarly secured, mounted, or fixed to the first and second sidewalls 24, 26 at or near the intersection of the first and second vertical panels 25, 27 with the first and second horizontal panels 29, 31, respectively. Ideally, when it is desired that the plate member 36 no longer be used, it may readily be removed from and later reattached to the pickup truck 10 with ease. The plate member 36 is configured to be selectively positioned at a first position, illustrated as 36A in FIG. 1 in phantom, and one or more of a second position, illustrated as 36B in FIG. 1 in phantom, a third position 36C, and a forth position 36D. Ideally, the plate member 36 can be positioned at all four positions in a single application.

When the plate member 36 is in the first position 36A, it is parallel to and substantially flush against the tailgate assembly 32. The first position 36A is intended primarily for stowage of the plate member 36 to prevent damage and unnecessary wear. When in the second position 36B, the plate member 36 preferably has a substantially vertical orientation, wherein the first end 37 is disposed proximate to, and the second end 39 is distal from the top end 35 of the tailgate assembly 32. Referring back to FIG. 1, when in the third position 36C, the plate member 36 is preferably in a substantially horizontal orientation, extending towards the forward end 28 of the bed portion 20. Finally, when in the fourth position 36D, the plate member 36 is preferably in a substantially horizontal orientation, extending reward from the tailgate assembly 32.

Figure 3:
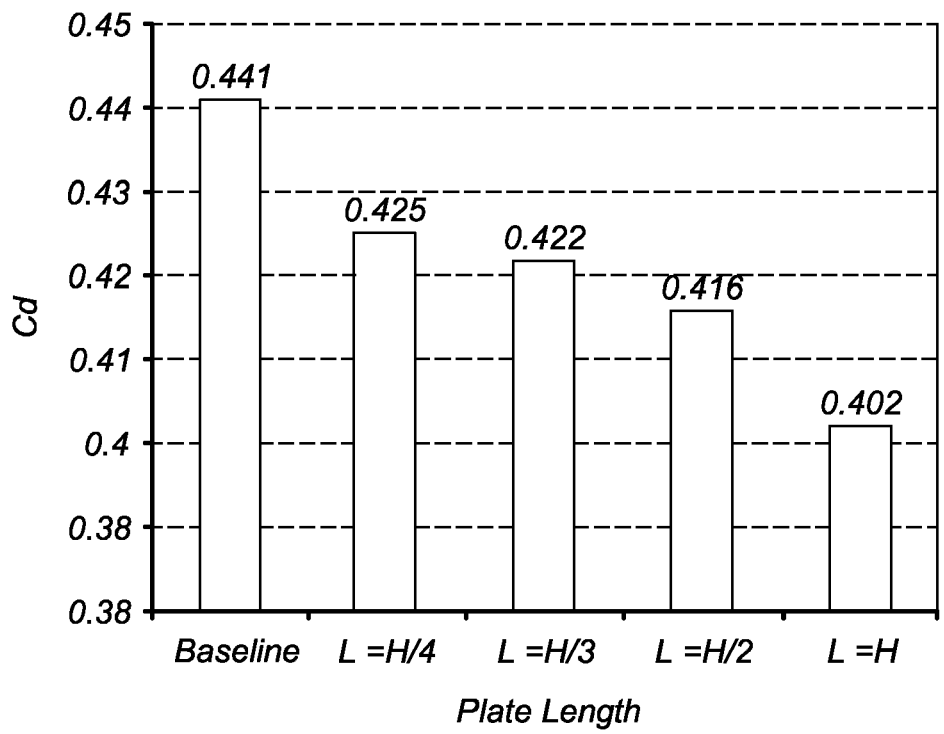
FIG. 3 is a table providing an exemplary illustration of the relationship between the length of the plate member and the reduction in the coefficient of drag in accordance with the present invention.
Figure 4:
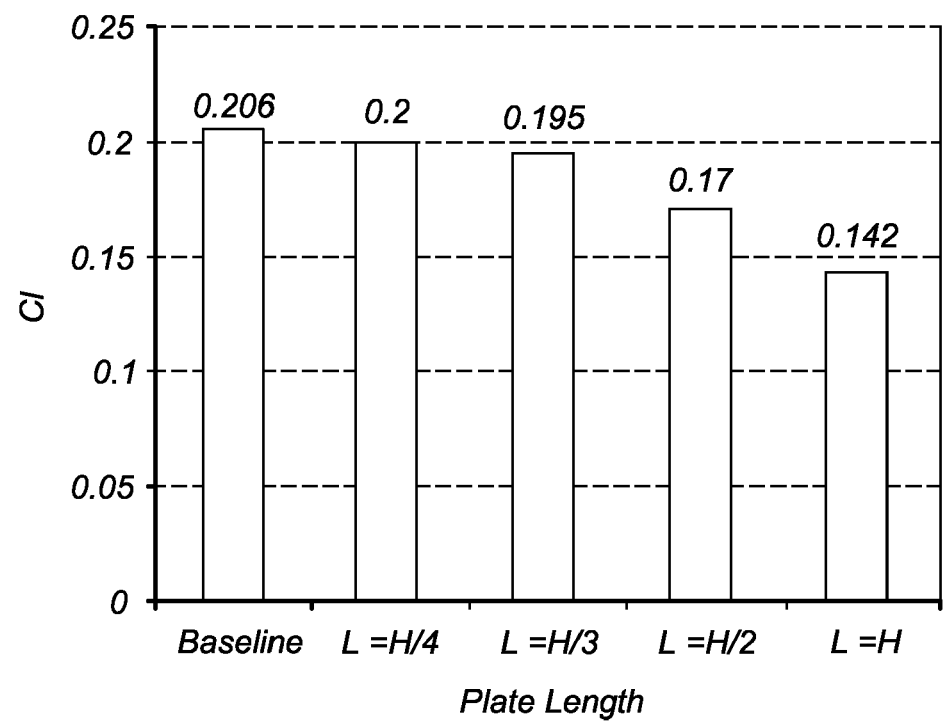
FIG. 4 is a table providing an exemplary illustration of the relationship between the length of the plate member and the reduction in the coefficient of lift in accordance with the present invention.

The plate member 36 is of a length L sufficient to alter the airstream wake flow structure rearward of the cab portion 18, in and around the bed portion 20, and rearward of the tailgate assembly 32. Turning to FIGS. 3 and 4, tables are provided to illustrate the reduction in the coefficient of drag (Cd, FIG. 3) and the coefficient of lift (Cl, FIG. 4) in accordance with four exemplary lengths, L=H/4,H/3,H/2,and H/1, relative to the height H of the tailgate assembly 32 when the plate member 36 is in the fourth position 36D. For example, FIG. 3 demonstrates that the drag reduction device 12 can provide a 3.6% reduction in the coefficient of drag Cd from the baseline model (absent the drag reduction device 12) when the length L of the plate member 36 is one-fourth (¼) the height H of the tailgate assembly 32 and disposed in the fourth position 36D. Similarly, when the length L of the plate member 36 is equal to the height H of the tailgate assembly 32, and disposed in the fourth position 36D, there is approximately an 8.9% reduction in the coefficient of drag Cd.

Optimally, the drag reduction devices described herein also reduce the coefficient of lift Cl experienced by the pickup truck 10 while in operation. As best seen in FIG. 4, when the length L of the plate member 36 is one-fourth the height H of the tailgate assembly 32, and disposed in the fourth position 36D, there is a 2.9% reduction in the coefficient of lift Cl from the baseline model. In a similar respect, when the length L of the plate member 36 is equal to the height H of the tailgate assembly 32, and disposed in the fourth position 36D, there is almost a 31.1% reduction in the coefficient of drag Cd from the baseline model. Optimally, the plate member 36 is of sufficient length L to provide both an 8.9% reduction in horizontal drag coefficient and a 31.1% reduction in lift coefficient. It should be recognized that FIGS. 3 and 4 are intended as purely exemplary of the aerodynamic benefits provided by the present invention, and are not considered to be limiting by any means. In this regard, the length L of the plate member 36 can be selectively varied to achieve varying degrees of reduction in base drag and aerodynamic lift forces, depending upon the intended application of the drag reduction device 12.

Referring now to FIGS. 2a-2b, a drag reduction device, generally indicated as 112, is provided in accordance with a second embodiment of the present invention. The drag reduction device 112 includes a tailgate assembly 132 and a plate member 136. The plate member 136 is shaped and fabricated as described above with respect to the plate member 36 of FIG. 1. The tailgate assembly 132 of FIGS. 2a and 2b includes a first panel member 142 having a bottom end 133 opposing a top end 135 that is preferably constructed from a high strength, light weight material suitable for the intended use of the drag reduction device 112, such as, but not limited to, high strength plastics, aluminum, and the like. The tailgate assembly 132 of FIGS. 2a and 2b can be original equipment manufactured (OEM), as depicted in FIG. 1, or can be an after market product, as illustrated in FIGS. 2a-2b. The tailgate assembly 132 is secured, preferably to selectively rotate (e.g., via horizontal hinge pins 141 or similar element), at a bottom end 133 to the rear vehicle structure, identified generally as 122, of a pickup truck (not shown). Functioning as described with respect to the latch mechanism 34 of FIG. 1, a latch mechanism (not shown) is preferably incorporated to selectively secure the tailgate assembly 132 in a closed position, similar to that shown in FIGS. 2a and 2b.

Turning to FIG. 2a, the first panel member 142 of the tailgate assembly 132 defines a recess portion, identified generally as 140A, disposed in a forward facing orientation. The plate member 136 is secured, fixed, or attached at a first end 137 (e.g., via horizontal hinge pins 138) at or near the top end 135 of the tailgate assembly 132 in a permanent or semi-permanent manner so as to be selectively positioned at a first position 136A and a third position (shown in phantom as 136C), and preferably also at second and fourth positions (shown in phantom as 136B and 136D, respectively.) The tailgate assembly 132 illustrated in FIG. 2a cooperates with the plate member 136 in accordance with the tailgate assembly 32 and plate member 36 of FIG. 1.

FIG. 2b is a schematic side illustration of an alternate variation of the drag reduction device 112 of FIG. 2a. In this instance, the first panel member 142 of the tailgate assembly 132 of FIG. 2b defines a recess portion, identified generally as 140B, disposed in a rearward facing orientation. As such, the plate member 136 is secured, fixed, or attached to the tailgate assembly 132 in a permanent or semi-permanent manner so as to be selectively positioned at the first and fourth positions 136A, 136D, and preferably also at the second and third positions 136B, 136C. The tailgate assembly 132 illustrated in FIGS. 2b cooperates with the plate member 136 in accordance with the tailgate assembly 32 and plate member 36 of FIG. 1.

Referring now to both FIGS. 2a and 2b, when the plate member 136 is in the first position 136A it is located predominantly within the recess portion 140A, 140B for stowage purposes. Similar to the first embodiment illustrated in FIG. 1, the first position 136A is intended primarily for stowage of the plate member 136 to prevent damage and unnecessary wear. When in the second position 136B, the plate member 136 extends outside the recess portion 140A, 140B, in a substantially vertical orientation, wherein the first end 137 of the plate member 136 is disposed proximate to, and the second end 139 is distal from the top end 135 of the tailgate assembly 132. When in the third position 136C, the plate member 136 extends forward of the tailgate assembly 132, preferably in a substantially horizontal orientation, outside the cavity 140A, 140B. Finally, when in the fourth position 136D, the plate member 136 extends rearward of the tailgate assembly 132, preferably in a substantially horizontal orientation, outside the recess portion 140A, 140B. Ideally, the tailgate assembly 132 provides a rounded top end 144 proximate to the first end 137 of the plate member 136, providing for improved airstream flow over and around the top end 135 of the tailgate assembly 132. The plate member 136 is ideally configured to be positioned at all four positions, 136A-136D, in a single application.

Similar to the embodiment of FIG. 1, the plate member 136 of the drag reduction device 112, FIGS. 2a-2b, is of a length L sufficient to alter the airstream wake flow structure in and around a pickup truck (i.e., 10 in FIG. 1.) In this regard, the length L of the plate member 136 can be selectively varied to provide varying degrees of reduction in base drag and aerodynamic lift forces, depending upon the intended application of the drag reduction device 112. Optimally, the plate member 136 is of sufficient length L to provide both an 8.9% reduction in horizontal drag coefficient and a 31.1% reduction in lift coefficient.

Turning now to FIG. 5, a drag reduction device 212 in accordance with a third embodiment of the present invention is provided. The drag reduction device 212 includes a tailgate assembly 232 and a plate member 236. The plate member 236 is shaped and fabricated as described above with respect to the plate member 36, 136 of FIGS. 1-2b. The tailgate assembly 236 has a bottom end 233 opposing a top end 235, and includes first and second panel members 242, 244, respectively, constructed from a high strength, light weight material suitable for the intended use of the drag reduction device 212, such as, but not limited to, high strength plastics, aluminum, and the like. The first and second panel members 242, 244 of the tailgate assembly 232 define a cavity therebetween, depicted generally as broken lines 240 in FIGS. 5b-5d, having an opening 246. The tailgate assembly 232 of FIG. 5 can be original equipment manufactured, as depicted in FIG. 1, or can be an after market product, as depicted in FIGS. 2a-2b. The tailgate assembly 232 is secured, preferably to selectively rotate (e.g., via horizontal hinge pins 241 or similar element), at the bottom end 233 to the rear structure of the pickup truck 210, e.g., the rearward end of the bed portion 220 opposite the cab portion 218. Functioning as described with respect to the latch mechanism 34 of FIG. 1, a latch mechanism 234 is preferably incorporated to selectively secure the tailgate assembly 232 in a closed position, as shown throughout FIGS. 5a-5d.

FIGS. 5a-5d are individual side schematic views of the drag reduction device 212 of FIG. 5, illustrating the plate member 236 moving from a first position 236A, FIG. 5a, to a second position 236B, FIG. 5b, and to a third position 236C, FIG. 5c, or a fourth position, 236D, FIG. 5d. The plate member 236 is preferably slidably mounted at a first end 237, e.g., via mechanized lateral pins 238, to the tailgate assembly 232, to be selectively positioned at all four positions 236A-236D. Although not required, the plate member 136 is ideally configured to securely position at all four positions, 136A-136D, in a single application. However, the plate member 236 may be mounted by any means known in the art to securely and safely position the plate member 236 at any of the several positions depicted throughout FIGS. 5a-5d. By way of example, the plate member 236 can be selectively positioned manually, electro-mechanically, pneumatically, and by various other similar methods.

Referring now to FIG. 5a, when in the first position 236A, the plate member 236 is located predominantly within the cavity 240 for stowage purposes. Similar to the embodiments of FIGS. 1-2b, the first position 236A is intended primarily for stowage of the plate member 236 to prevent damage and unnecessary ware. When the plate member 236 is in the second position 236B, FIG. 5b, it extends at least partially outside the cavity 240 in a substantially vertical orientation, to thereby displace the second end 239 distal to the top end 235 of the tailgate assembly 232. Ideally, the plate member 236 is extendable completely outside cavity 240 of the tailgate assembly 232, wherein the first end 237 of the plate member 236 is disposed proximate to the top end 235 of the tailgate assembly 232.

Looking at FIG. 5c of the drawings, when the plate member 236 is in the third position 236C, it extends forward of the tailgate assembly 232 toward the cab portion 218, preferably in a substantially horizontal orientation, outside the cavity 240. Finally, when in the fourth position 236D, the plate member 236 extends rearward of the tailgate assembly 232, preferably in a substantially horizontal orientation, outside the recess portion 240. The plate member 236 is depicted in FIGS. 5c and 5d as being substantially flush to the top of the bed portion 220 when in the third position 236C. However, the plate member may also be offset from the top end 235 of the tailgate assembly 232, similar to the first embodiment of FIGS. 1-2b. In that case, the tailgate assembly 232 preferably provides a rounded top end, also shown in FIGS. 2a-2b, proximate to the first end 237 of the plate member 236.

Similar to the embodiments of FIGS. 1-2b, the plate member 236 of the drag reduction device 212, FIGS. 5a-5d, is of a length L sufficient to alter the airstream wake flow structure behind the cab portion 218, in and around the cab portion 220, and rearward of the pickup truck 210. In this regard, the length L of the plate member 236 can be selectively varied to provide varying degrees of reduction in base drag and aerodynamic lift forces, depending upon the intended application of the drag reduction device 212. Optimally, the plate member 236 is of sufficient length L to provide both an 8.9% reduction in horizontal drag coefficient and a 31.1% reduction in lift coefficient.

While the best modes for carrying out the present invention have been described in detail, those familiar with the art to which this invention relates will recognize various alternative designs and embodiments for practicing the invention within the scope of the appended claims.

The invention claimed is:

1. A drag reduction device for a motor vehicle having rear vehicle structure, the drag reduction device comprising:
   a tailgate assembly oriented transversely to the motor vehicle and having a first panel forming a recess portion, wherein said first panel has a planar portion which spans substantially continuously across the transverse length of said tailgate assembly and said recess portion spans substantially across the transverse length of said first panel and is adjacent and parallel to said planar portion, said tailgate assembly operatively secured to the rear vehicle structure; and a plate member operatively connected to said tailgate assembly at a first end of said plate member and configured to be selectively positioned at a first position, a second position, a third position, and a fourth position relative to said first panel, said first position being substantially inside said recess portion for stowage purposes, said second position being a substantially vertical orientation at least partially extended outside said recess portion, said third position being a forwardly extended orientation outside said recess portion, and said fourth position being a rearwardly extended orientation outside said recess portion, wherein said plate member has a length sufficient to provide at least one of a reduction in horizontal drag coefficient and a reduction in lift coefficient.

2. The drag reduction device of claim 1, wherein said plate member is of sufficient length to provide both a reduction in horizontal drag coefficient and a reduction in lift coefficient.

3. The drag reduction device of claim 2, wherein said plate is sufficiently long to provide at least one of a 3.6 to 8.9% reduction in horizontal drag coefficient and a 2.9 to 31.1% reduction in lift coefficient.

4. The drag reduction device of claim 3, wherein said third and fourth positions are of a substantially horizontal orientation.

5. The drag reduction device of claim 4, wherein said tailgate assembly has a rounded top end proximate to the first end of said plate member.

6. The drag reduction device of claim 5, wherein said tailgate assembly further includes a second panel, said first and second panels defining said recess portion therebetween.

7. The drag reduction device of claim 6, wherein said plate member length is one of ¼, ⅓, ½ and 1/1 the height of the tailgate assembly.

8. A motorized vehicle having a frame, the motor vehicle comprising:

a cab portion operatively secured to the vehicle frame;

a bed portion substantially adjacent said cab portion;

a tailgate assembly having a first panel defining a cavity with an opening, wherein said cavity is oriented transversely across the length of said tailgate assembly and is parallel to said first panel, said tailgate assembly operatively secured to said bed portion; and a substantially flat plate member operatively connected to said tailgate assembly at a first end of said plate member and configured to be selectively positioned at a first position, a second position, a third position, and a fourth position relative to said first panel, said first position being substantially inside said cavity for stowage purposes, said second position being a substantially vertical orientation at least partially extending outside said cavity and remaining substantially parallel to said cavity of said first panel, said third position being a forwardly extending substantially horizontal orientation outside said cavity, and said fourth position being a rearwardly extending substantially horizontal orientation outside said cavity, wherein said plate member is of sufficient length to alter the air flow structure around and behind the vehicle while in operation.

9. The vehicle of claim 8, wherein said tailgate assembly further includes a second panel, said first and second panels being oriented transversely and defining said cavity therebetween, wherein said cavity is a U-shaped channel open at said first end of said plate member.

10. The vehicle of claim 9, wherein said plate member is of sufficient length to provide a 3.6 to 8.9% reduction in horizontal drag coefficient and a 2.9 to 31.1% reduction in lift coefficient.

11. The vehicle of claim 10, wherein said plate member is not coplanar with the top of said bed portion when in said third and said fourth positions, said tailgate assembly having a rounded top end proximate to said first end of said plate member.

12. The vehicle of claim 11, wherein the plate member length is one of ¼, ⅓, ½ and 1/1 the height of at least one of said first and second panels.

* * * * *